United States Patent [19]
Cagle

[11] 4,218,769
[45] Aug. 19, 1980

[54] MEANS FOR SUBDIVIDING A BAUD PERIOD INTO MULTIPLE INTEGRATION INTERVALS TO ENHANCE DIGITAL MESSAGE DETECTION

[75] Inventor: George C. Cagle, Plano, Tex.

[73] Assignee: Rockwell International Corporation, El Segundo, Calif.

[21] Appl. No.: 15,276

[22] Filed: Feb. 26, 1979

[51] Int. Cl.³ .................... H04L 27/32; H03D 3/22
[52] U.S. Cl. .................................. 375/95; 375/119; 340/310 A
[58] Field of Search ................ 325/320; 178/67, 88; 307/210; 328/133, 134, 140; 329/104, 105, 107; 364/111, 484, 485, 701, 702, 703; 340/170, 310 R, 310 A; 375/80, 82, 86, 94, 95, 119

[56] References Cited
U.S. PATENT DOCUMENTS

| | | | |
|---|---|---|---|
| 3,909,599 | 9/1975 | Trott, Jr. et al. | 364/484 |
| 4,071,821 | 1/1978 | Harthill et al. | 328/140 |
| 4,079,329 | 3/1978 | England et al. | 325/320 |
| 4,163,218 | 7/1979 | Wu | 340/310 A |

Primary Examiner—Benedict V. Safourek
Attorney, Agent, or Firm—Howard R. Greenberg; H. Fredrick Hamann

[57] ABSTRACT

A carrier signal bearing digital data which varies a characteristic of the carrier signal during each baud period in a predetermined manner to identify the baud value during the period is demodulated by subdividing each baud period into n intervals, converting the carrier signal characteristic to a DC signal which is integrated over each of the intervals and summing the integrated DC signal attained at the end of each interval with the integrated DC signals attained at the end of the previous n-1 intervals.

9 Claims, 5 Drawing Figures

MEANS FOR SUBDIVIDING A BAUD PERIOD INTO MULTIPLE INTEGRATION INTERVALS TO ENHANCE DIGITAL MESSAGE DETECTION

BACKGROUND OF THE INVENTION

The invention herein pertains generally to digital communications and specifically to the detection of baud values where the data bauds are conveyed by an AC carrier signal.

The transmission of digital data by varying some characteristic of an AC carrier signal, such as its phase or frequency, commonly referred to as phase shift and frequency shift keying, respectively, is widely practiced. Intrinsic to this mode of communications is the need to establish appropriate symbol timing at the receiver to identify the beginning and termination of each baud period (also known as symbol period), wherein a single unit of data comprising one or more data bits is transmitted, to permit the detection thereof. As is well documented in the technical literature, including U.S. Pat. No. 3,368,036 entitled "Demultiplexing and Detecting System for Predicted Wave Phase Pulse Data Transmission System" owned by the same assignee herein, a common technique to detect the value of each data baud is one known as "integrate and dump" wherein a DC signal is allowed to linearly vary over the baud period with a polarity which is a function of the carrier signal characteristic vis-a-vis some reference signal, thereby defining the baud value. The efficacy of this detection technique is based on encompassing each integration period within the associated transmitted baud period so that it does not overlap into the next baud period, and consequently the need for developing appropriate symbol timing in the receiver.

One conventional method for affording appropriate symbol timing is to transmit along with the carrier signal a pilot tone so that the receiver timing can be synchronized to that employed in the transmitter. In some communications media, however, this tone and its associated equipment can be eliminated by employing a synchronizing signal which is intrinsically available at both the transmitter and receiver. For example, in the evolving technical field of power line communications for permitting electric utility companies to transmit communication signals over their distribution power lines to remotely control customer loads and monitor energy consumption, symbol timing can be derived from the 60 hertz power system itself since the transmitter and receiver are both connected thereto. Relying on the 60 hertz power signal as a synchronizing agent, however, creates a problem in selecting the proper cycle during a given baud period as well as the point of the AC cycle to which to synchronize. Since the zero crossing of an AC signal is the most discernible and therefore most logical point to which to synchronize, this is the common practice. However, ambiguities arise, the severity of which is dependent on the baud rate. As an example, if one were to transmit at a data rate of 60 baud/second, there would be one 60 hertz AC cycle and concomitantly two zero crossings per baud between which to choose for synchronization. At a lower rate, for instance 20 baud/second, there would be three 60 hertz AC cycles and concomitantly six zero crossings per baud to contend with. If the integration period corresponding to an individual baud were to be initiated on the wrong zero crossing, it then would overlap into the consecutive baud period, rendering it more difficult to accurately detect data by adding to or subtracting from the integrated value which would have been obtained if the integration had been initiated at the right zero crossing.

In two copending U.S. patent applications filed concurrently herewith and owned by the same assignee as the instant one, two different techniques are disclosed for retrieving the digital data borne by a carrier signal through the use of the zero crossings of a system AC signal. Application Ser. No. 015,672 entitled "Detection Means for Providing Multiple Baud Values Per Individual Baud Period of a Carrier Signal to Obviate Baud Timing Ambiguities" delineates an approach which entails detecting digital data from the carrier signal for each of the zero crossings that occur during a single baud period and then selecting which of the multiple group of data is the correct one, while the other application Ser. No. 015,104 entitled "Means for Deriving Baud Timing From an Available AC Signal" describes a technique for identifying the correct zero crossing to which to synchronize the baud timing for data detection. Both of the two foregoing techniques engender the aforementioned integration process and are therefore prime candidates for any improvement in that process.

With the foregoing in mind, it is a primary object of the present invention to provide a new and improved integration technique for detecting digital data conveyed by the varying characteristic of a carrier signal.

It is a further object of the present invention to provide such a new and improved integration technique for use in conjunction with an AC signal having multiple zero crossings during each baud period that can be used for baud timing synchronization.

It is still a further object of the present invention to provide such a new and improved integration technique which affords speed of operation and minimizes requisite hardware.

The foregoing objects, as well as others, and the means by which they are achieved through the present invention may best be appreciated by referring to the Detailed Description of the Preferred Embodiment which follows together with the appended drawings.

SUMMARY OF THE INVENTION

In accordance with the stated objects, the invention herein develops the baud timing for demodulating a carrier signal bearing digital data which varies a characteristic of the carrier signal during each baud period in a predetermined manner to identify the baud value during the period by subdividing each baud period into n intervals, converting the carrier signal characteristic to a DC signal which is integrated over each of the intervals, and summing the integrated DC signal attained at the end of each interval with the integrated DC signals attained at the end of the previous n-1 intervals. When the transmitted baud period is synchronized to the zero crossing of an available systemwide AC signal, such as the electric power system frequency, n is made equal to the number of zero crossings which occur during a single baud period and each integration interval is initiated at a zero crossing. The multiple (n) integrals obtained during each baud period may then be used to obtain multiple baud values from which to select the transmitted digital data or to identify the correct zero crossing for synchronization to detect the data which, as mentioned previously, are the subjects of copending patent application Ser. Nos. 015,672 and 015,014, respectively. The integration intervals are efficiently provided through the use of a pair of integrators with each integrating the DC signal during alternate intervals while the other is initialized to a predetermined state preparatory to an integration cycle.

DETAILED DESCRIPTION OF THE PREFERRED EMBODIMENT

Only for purposes of exemplification, the subject invention will be described in connection with a commercial communications system developed by the assignee herein known as Kineplex which entails transmitting digital data via a carrier signal employing 4φ differential phase keying (DPSK) so that two bits of data correspond to each baud period and the phase of the carrier signal acts as a reference for the consecutive baud period. This system is described at length in U.S. Pat. No. 3,368,036, previously alluded to, and therefore will be treated only briefly herein as is necessary to afford an understanding of the subject invention. Also, once again only for exemplary purposes, the invention will be described in conjunction with one of its specific applications, namely the acquisition of multiple data baud values per baud period from which to select the data specifically addressed by copending application Ser. No. 015,672 entitled "Detection Means for Providing Multiple Baud Values Per Individual Baud Period of a Carrier Signal to Obviate Baud Timing Ambiguities."

As delineated in the U.S. Pat. No. 3,368,036, the phase angle of a carrier signal is advanced 45° or some odd multiple thereof during each baud period from the previous baud period, with the change being dependent on which one of the four combinations of two binary data bits is engendered in the digital information to be transmitted during that period. The data contained in the baud period is detected at the receiver by mixing with the carrier signal two AC signals of like frequency equal to that of the carrier, but differing in phase angle by 90°, which produces two output signals having respective DC components whose polarities are a function of the sine of the carrier phase angle, when referenced to some fixed angle for one of the signals (quadrature component) and its cosine for the other signal (in phase component). These signals are separately integrated over the baud period, at the end of which they are combined with their counterparts for the previous baud period to yield the in phase (cosine) and quadrature phase (sine) components of the phase difference in the carrier signal between two consecutive baud periods which then defines the two data bit values by virtue of the respective trigonometric signs.

Figure 1:
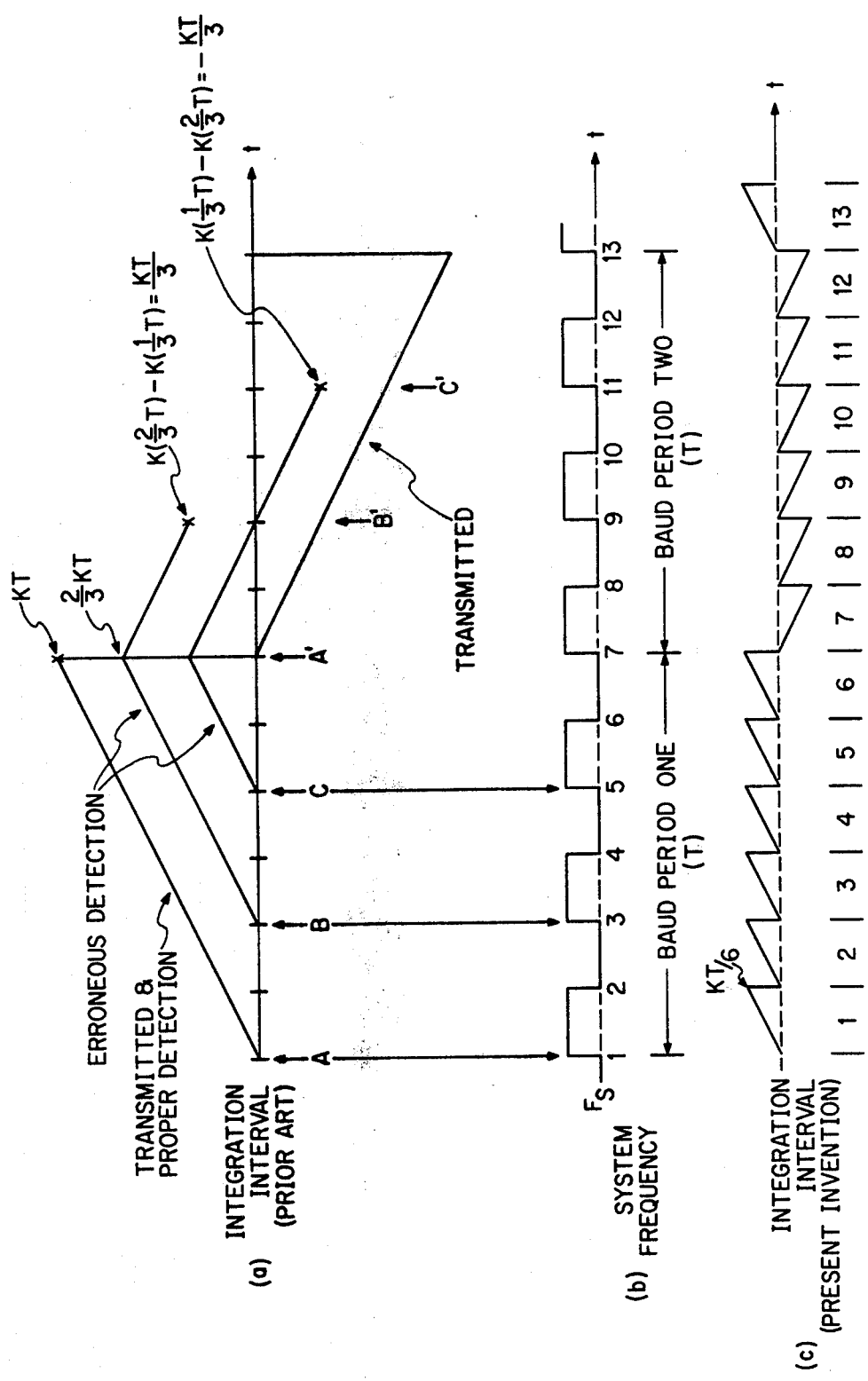
FIG. 1 consists of waveforms expository of the invention.

The foregoing is represented as the first integration waveform (a) in FIG. 1 designated prior art. This waveform (a) corresponds to only one of the DC components being integrated and it is to be realized that the second component needed to define a baud comprising two bits is not shown since it would not contribute to the understanding of the reader. Assuming that the symbol timing was derived from waveform (b) designated $F_s$ for the system frequency AC signal, it will be observed that each baud period, and consequently each integration period, corresponds to three full cycles of $F_s$. Specifically, $F_s$ could be a system frequency such as found on the 60 hertz electric power system in the United States (limited in amplitude so as to produce the depicted square wave) with three cycles thereof then representing a data rate of 20 baud/second. Further assuming that a data period designated baud period one was transmitted coincident with the first zero crossing of $F_s$, at point A, the detector in the receiver would properly begin integrating at point A and terminate at point A' to afford an integrated value equal to kT where k can be any real number and T is the baud period (1/Baud Rate or 50 ms=(1/20)herein). Now, through error, assume that rather than the first zero crossing shown for $F_s$ at point A in waveform b, the third zero crossing commencing with the second cycle designated point B, is chosen on which to begin the integration process. In this case, the integrated signal would linearly increase to a value of k($\frac{2}{3}$T) at point A' and then decrease to a value of kT/3 at B' (assuming the value for baud period two would result in a negative DC trigonometric component) because of the overlap of the integration operation for baud period one into baud period two. Thus, instead of generating the proper value of kT for baud period one, kT/3 would be realized. Even though it is the polarity of the integrated value which determines the baud value, deviations in the magnitude thereof render the detection process more difficult to effectuate and, in fact, can introduce data errors created by a degradation in signal/noise ratio for the integrated signal. As an example, were the integration period for baud period one to begin on the fifth zero crossing of $F_s$ at point C, the integrated value attained would be −kT/3, clearly erroneous because of the negative, rather than positive sign.

The subject invention contributes to obviating the foregoing problem by subdividing the baud period into n intervals, such as six shown in waveform (c) of FIG. 1, for the system frequency signal $F_s$ having six zero crossings per baud period. Rather than integrate over the entire period are represented by waveform (a), the integration process is separately applied to each of the n intervals wherein each integration is initiated at the beginning of the interval and terminated at its end. Thus, as shown by waveform (c), six separate integrations are performed during baud period one, rather than the single one of waveform (a). The integrated value attained at the end of each interval is then added to the corresponding values for the preceding n-1 intervals or five in the example of waveform (c). Thus, at the end of interval 6 its value is added to that for intervals 1–5 to yield kT. Similarly, the integrated value attained at the end of interval 7 is added to the values corresponding to intervals 2–6. The foregoing integrated value summation is repeated at the end of each of the subsequent intervals by adding the integrated value attained to the previous five intervals. Consequently, each baud period gives rise to n or in the depicted example six integrated value summations indicative of the baud value rather than the single value of waveform (a). These six values can then be arithmetically processed in various ways to optimize the validity of the detected data. For example, a very simple preferred way to be described hereinafter merely entails storing the n baud values in n registers on a cyclical basis and then selecting the first recognizable digital message via predetermined bit patterns.

It is recognized that the multiple integrals per baud period could be generated in conventional fashion by sequentially initiating a single integration cycle extending over an entire baud period at each AC signal zero crossing. However, as will be appreciated hereinafter, this would require much more integration hardware than the present invention, necessitating six integration circuits rather than the two to be described for the instant case. Although the copious hardware could be eliminated by monitoring a single zero crossing per baud period from which to generate the integrated DC signal, this results in the penalty of extended data time periods for obtaining baud synchronization since n baud periods would then have to transpire to permit all n zero crossings to be analyzed (e.g. looking at the first zero crossing of $F_s$ in baud period one, the eighth zero crossing of $F_s$ in baud period two, etc.).

When an absolute reference frequency is employed, the integration process is performed after mixing the carrier signal with the reference frequency so that the polarity of each integrated value and consequently integrated value summation automatically determines the baud value. However, when the modulation is not predicated on an absolute reference, but rather DPSK where the reference signal during each baud period is derived from the carrier signal for the immediately preceding baud period, the carrier signal phase in the detected baud period is relative and therefore the integrated value summation attained at the end of each interval must be compared with its counterpart for the preceding period. Accordingly, the summations are stored for an additional period of time subsequent to their development so that they can be used as references against which to compare successive summations. For example, in deriving the baud value corresponding to interval 12, the integrated value summation for the six intervals 7–12 is compared with that for the six intervals 1–6. Similarly, the baud value corresponding to interval 13 is derived by comparing the integrated value summation for the six intervals 8–13 with that for the six intervals 2–7.

Figure 2:
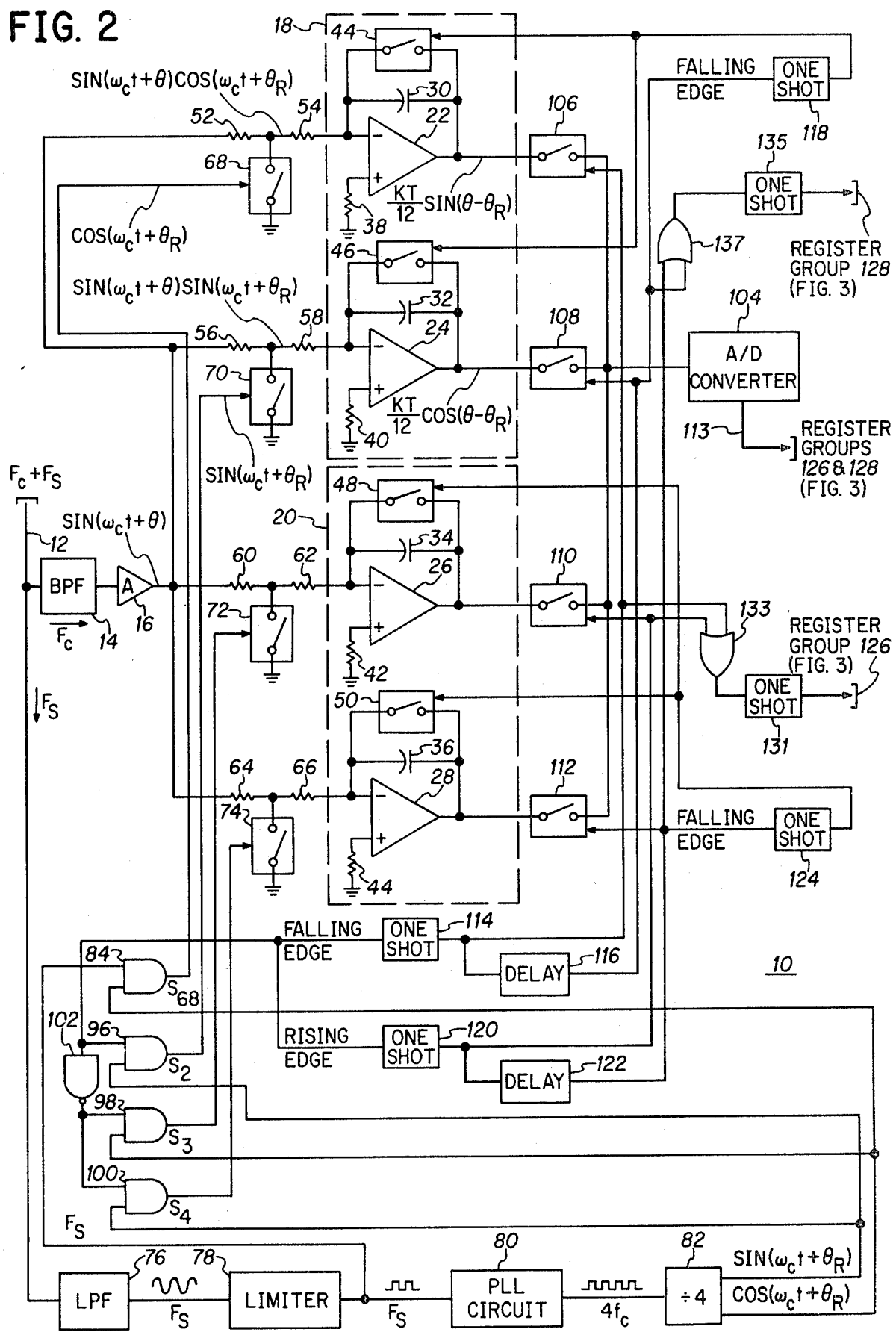
FIG. 2 depicts the integration and associated timing circuitry of the invention.

Referring now to FIG. 2, the preferred apparatus for providing the individual integration values will be described. As shown therein, the apparatus designated generally by the reference numeral 10, receives the AC carrier signal $F_c$ in which the data bauds are conveyed and the system frequency signal $F_s$ over lead 12 which would be connected to the electric power system where the carrier signal $F_c$ was transmitted thereover and $F_s$ corresponded to the 60 hertz power line frequency. $F_c$ is passed through a bandpass filter 14, whose bandpass is centered about the carrier frequency, and then amplified by amplifier 16 whose output is then the pure carrier signal $F_c$ defined as $\sin(\omega_c t + \theta)$ where $\omega_c = 2\pi f_c$ with $f_c$ being the carrier frequency and $\theta$ the phase angle, the characteristic of the carrier signal which defines the baud value. In other modulation schemes, the characteristic could just as well be either the frequency or amplitude of the carrier signal. The output of amplifier 16 is connected to a pair of integrating circuits 18 and 20, each of which comprises a pair of operational amplifiers, 22 and 24 for circuit 18, and 26 and 28 for integrating circuit 20. These four operational amplifiers 22–28 are arranged exactly the same so as to function as integrators and, as such, respectively comprise four capacitors 30–36 interconnecting their respective outputs with their inverting (−) inputs, four resistors 38–44 connecting their non-inverting (+) inputs to ground and symbolically depicted four switches 44–50 respectively connected across capacitors 30–36. The output of amplifier 16, $F_c$ is applied to the inverting inputs of amplifiers 22–28 through series connected resistors 52 and 54, 56 and 58, 60 and 62, and 64–66, respectively. The interconnection point of each pair of the foregoing series resistors is connected to ground through switches 68–74, respectively associated with amplifiers 22–28. These switches, which are depicted symbolically, would normally be implemented through a solid state design.

As is well known, cyclically controlling by a square wave the closure of a switch such as 68 which is connected to a signal path in synchronous detection produces the product of the signal entering the path and the Fourier sinusoidal components of the square wave at the output of the switch. Consequently, applying to switch 68 a sqaure wave signal whose fundamental component is $\cos(\omega_c t + \theta_R)$ where $\omega_c = 2\pi f_c$, $f_c$ being the carrier frequency, and $\theta_R$ is some fixed reference phase angle, produces a signal to the inverting input of amplifier 22 equal to $\sin(\omega_c t + \theta)\cos(\omega_c t + \theta_R)$ which has a DC component that is proportional to $\sin(\theta - \theta_R)$ [which in this case is equal to $\sin(\theta - \theta_R)$ since the sinusoidal signals are assumed to have unity amplitude]. This result is clearly described in the U.S. Pat. No. 3,368,036, previously referred to, in connection with FIG. 1 thereof, where it will be recognized that mixer 18 for producing the requisite product has been preferably supplanted by electronic switch 68 of the subject invention as shown in FIG. 2 herein. None of the other products of the carrier signal and Fourier components produce a DC signal and are therefore of no interest. With switch 44 open and switch 68 operational in accordance with the control square wave signal represented by its fundamental component $\cos(\omega_c t + \theta_R)$, applied thereto, the DC voltage applied to the inverting input of amplifier 22 will cause the voltage developed across capacitor 30 to linearly vary, thus providing at the output of amplifier 22 the integrated value of the DC component with a like polarity. Since switch 68 is closed during every other half cycle for $F_c$, which time amplifier 22 cannot integrate, this half-wave integration process does not produce a smooth ramp as shown by waveform (c) of FIG. 1 but rather a sequence of ramps separated by steps. This, of course, only affects the integrated value attained at the end of the integration interval and not the integration principle. If a smooth ramp over the full integration interval is desired, then the circuitry of FIG. 2 can be supplemented with that of FIG. 5 to be explained shortly. If the integration period is made equal to one of the intervals corresponding to waveform (c) of FIG. 1, the value attained at the end of the integration interval will be equal to $KT/12 \sin(\theta - \theta_R)$. By going through the same steps as the foregoing, it will be readily seen that the application to switch 70 of a control square wave signal whose fundamental component is $\sin(\omega_c t + \theta_R)$ will produce at the output of amplifier 24 at the end of an integration interval $KT/12$ $\cos(\theta - \theta_R)$ so long as switch 46 remains open for the interval.

When an absolute reference signal separate and apart from the carrier signal is employed such as in absolute modulation schemes, the control signals $\sin(\omega_c t + \theta_R)$ and $\cos(\omega_c t + \theta_R)$ would be derived directly from the reference signal so that $\theta_R$ would normally be 0 and the signs of $\sin(\theta)$ and $\cos(\theta)$ would automatically define the baud value. However, when DPSK is employed such as herein, the baud value is determined by eliminating $\theta_R$ and developing the sin and cos of $(\theta_2 - \theta_1)$, where the subscript 2 corresponds to the baud period being detected and the subscript 1 corresponds to the preceding baud period. This will be explained later on.

In a similar fashion to the foregoing, $\cos(\omega_c t + \theta_R)$ and $\sin(\omega_c t + \theta_R)$ are applied respectively to switches 72 and 74 to produce at the outputs of amplifiers 26 and 28 KT/12 $\sin(\theta - \theta_R)$ and KT/12 $\cos(\theta - \theta_R)$ for also defining the carrier phase angle during some interval (vis-a-vis a fixed reference phase angle $\theta_R$). While one of the integrating circuits 18 and 20 is integrating, the other one is initialized (but only after an analog to digital conversion is performed as explained hereinafter) to prepare it for its integrating interval by discharging the associated capacitors through the associated switches connected thereacross. For example, if switches 44 and 46 were open during interval 1 for waveform (c) of FIG. 1, while switches 68 and 70 were operational, integrating circuit 18 would in fact be integrating, during which time switches 48 and 50 would be closed to discharge their respective capacitors 34 and 36 to prepare integrating circuit 20 for its integration cycle during integration interval two. Of course, during interval two, switches 44 and 46 would be closed to permit their respective capacitors 30 and 32 to discharge so as to prepare integrating circuit 18 for its next integrating cycle during interval three. Thus, it is seen that integrating circuit 18 integrates during the odd numbered intervals and discharges during the even numbered intervals, while integrating circuit 20 conversely integrates during the even numbered intervals and discharges during the odd numbered intervals.

Figure 4:
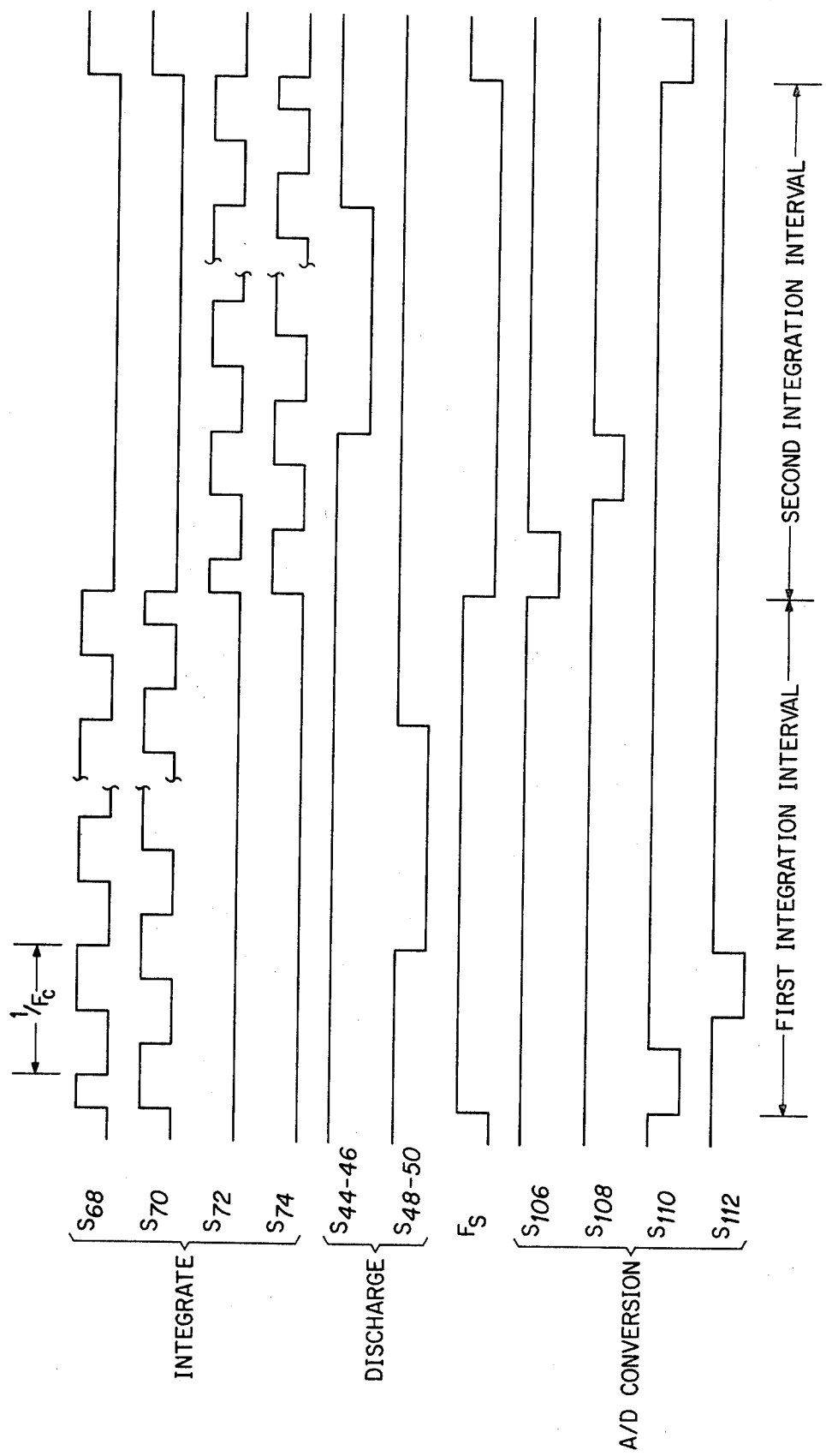
FIG. 4 consists of timing waveforms for use in conjunction with FIGS. 2 and 3 to facilitate an understanding of the invention.

The foregoing switch operations are reflected in the timing waveforms depicted in FIG. 4 wherein the first four waveforms are associated with controlling the operation of switches 68–74, respectively, and the next two waveforms control switches 44 together with 46 and 48 together with 50, respectively. A high level signal for the waveforms of FIG. 4 corresponds to a switch being open, while a low level signifies that the switch is closed. The waveforms of FIG. 4 are generated from the system frequency signal $F_s$ by first passing it through a low-pass filter 76 shown in FIG. 2 which eliminates unwanted frequencies such as the carrier signal $F_c$ and then, through a limiter 78, to provide an output signal which is a square wave whose frequency and phase are consonant with $F_s$. The output of limiter 78 is applied to a phase lock loop circuit 80 to produce at its output a square wave whose frequency is four times that of the carrier signal frequency $F_c$ which is locked together with the phase to the system frequency $F_s$. Thus as $F_s$ varies in frequency, as it may do so under adverse conditions, so does the frequency $4 f_c$ at the output of phase lock loop circuit 80. The output of phase lock loop circuit 80 is applied to a divide by 4 circuit 82 having two outputs which have a frequency equal to that of the carrier signal frequency $f_c$ and a phase angle $\theta_R$ with reference thereto, and which are represented mathematically only by their respective fundamental sinusoidal components. The two outputs have a phase angle difference of 90° so that one constitutes a sine function with the other constituting a cosine function. The cosine output of divide by 4 circuit 82 is connected as a first input to an AND gate 84 having a second input from the output of limiter 78 so that the gate is enabled to pass the square wave to its output $s_{68}$ during the first integration interval of $F_s$ shown in FIG. 4, as well as all successive odd integration intervals. During these odd integration intervals when AND gate 84 is enabled, the signal $s_{68}$ is applied to switch 68 to cause it to synchronously open and close which as already mentioned is equivalent to the mixing function of mixer 18 of FIG. 1 of the U.S. Pat. No. 3,368,036 previously alluded to. Consequently, the product of $\sin(\omega_c t + \theta)$ and $\cos(\omega_c t + \theta_R)$ is formed at the interconnection of the switch 68 with resistors 52 and 54. During this time it is to be noted that switches 44 and 46 are open to permit their respective capacitors 30 and 32 to linearly build up voltage during the integration interval. Since switch 68 is closed half the time during the integration interval, which inhibits the capacitor from receiving any charging current, as mentioned earlier the integration waveform would not be a smooth ramp as depicted in FIG. 1, but rather a sequence of little ramps (when switch 68 is open during the high level half cycles of the square wave) connected by flat portions when switch 68 is closed (during low level portions of the square wave $s_{68}$).

Figure 5:
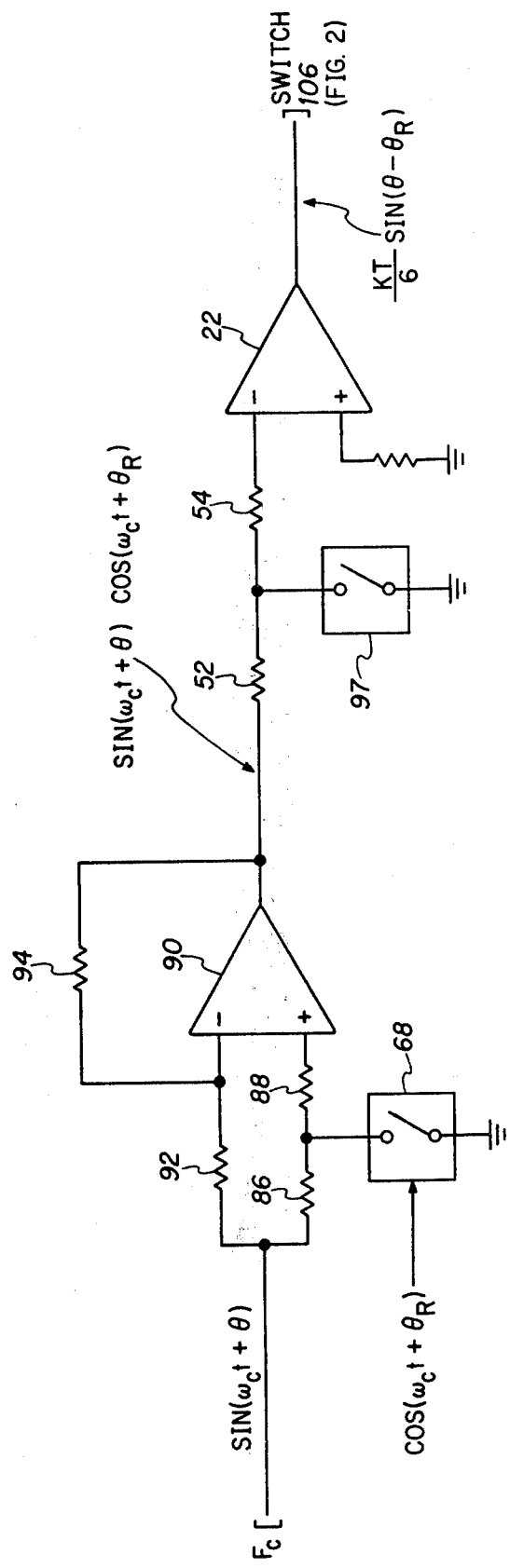
FIG. 5 shows circuitry supplementary to that of FIG. 2 for affording full-wave integration rather than half-wave in the detection process.

If integration throughout an integration interval is desired, for example to generate a high integration signal, then each of the operational amplifiers 22–28 can be supplemented with additional circuitry as shown in FIG. 5 in connection with operational amplifier 22. It will be seen therein that the mixing and integrating functions have been totally separated by connecting the synchronous switch 68 to the interconnection point of a pair of resistors 86 and 88, with resistor 88 being connected to the noninverting input of another operational amplifier 90. The carrier signal $F_c$ is applied to the noninverting input of operational amplifier 90 through the series resistors 86 and 88 as well as to the inverting input via a resistor 92. With another resistor 94 interconnecting the output and the inverting input of operational amplifier 90, a full-wave mixer with a gain of one is provided, by making resistors 92 and 94 the same value, and 86 and 88 as well. So long as a new switch 97, connected to the interconnection of resistors 52 and 54 associated with operational amplifier 22, is left open during the full integration interval, a smooth linear ramp will be obtained at the output of amplifier 22 without any steps in the waveform.

At the end of the first integration interval, the output of operational amplifier 22 is the integrated value of the DC component for the product of the $\sin(\omega_c t + \theta_1)$ and $\cos(\omega_c t + \theta_R)$, namely KT/12 $\sin(\theta_1 - \theta_R)$. In a similar fashion it will be seen that the output of operational amplifier 24 at this time is KT/12 $\cos(\theta_1 - \theta_R)$ because of the application to switch 70 of $\sin(\omega_c t + \theta_R)$ via an AND gate 96 having a second input derived from the output of limiter 78. Furthermore, it will be seen that the outputs of operational amplifiers 26 and 28 at the end of the second integration interval are respectively KT/12 $\sin(\theta_2 - \theta_R)$ and KT/12 $\cos(\theta_2 - \theta_R)$ by virtue of the application of $\cos(\omega_c t + \theta_R)$ to switch 72 via an AND gate 98 and $\sin(\omega_c t + \theta_R)$ to switch 74 via an AND gate 100. Both AND gates 98 and 100 have a second input which is derived from the output of limiter 78 after first inverting the signal through inverter 102. Consequently, these AND gates are enabled to pass their respective square waves during the even integration intervals associated with the system frequency signal $F_s$.

The outputs of amplifiers 22–28 are connected to an analog/digital (A/D) converter 104 via four individual switches 106–112 respectively associated therewith. The analog integrated value outputs of amplifiers 22–28 are thus converted to digital equivalents at the output of A/D converter 104 on bus 113 (which preferably comprises multiple leads for parallel bit operation) in multiplex fashion by sequentially closing switches 106–112. For example, switch 106 is closed upon the termination of the first integration interval by a low level signal generated at the output of a one shot multivibrator 114 which is triggered by the falling edge of the output of limiter 78, namely $F_s$. After sufficient time has transpired for the conversion to be effected, switch 106 is opened at the end of the one shot period and switch 108 is closed by the same output from one shot 114 via a delay circuit 116. Following the A/D conversions for the outputs of amplifiers 22 and 24, their respective capacitors 30 and 32 are discharged by the closure of the switches 44 and 46. The signal for this operation is derived by triggering a one shot multivibrator 118 by the falling edge output from delay circuit 116. In similar fashion, switch 110 is closed during each odd integration interval, after its associated integrating circuit 20 even integration interval, by the output of a one shot multivibrator 120, which is triggered by the rising edge of the output of limiter 78. Switch 112 is thereafter closed by first passing the output of one shot 120 through a delay circuit 122. Switches 48 and 50 are closed to discharge their respective capacitors 34 and 36 through a one shot multivibrator 124 which is activated by the falling edge of the output of delay circuit 122. The timing waveforms corresponding to the foregoing discharge and conversion operations are shown in FIG. 4.

Figure 3:
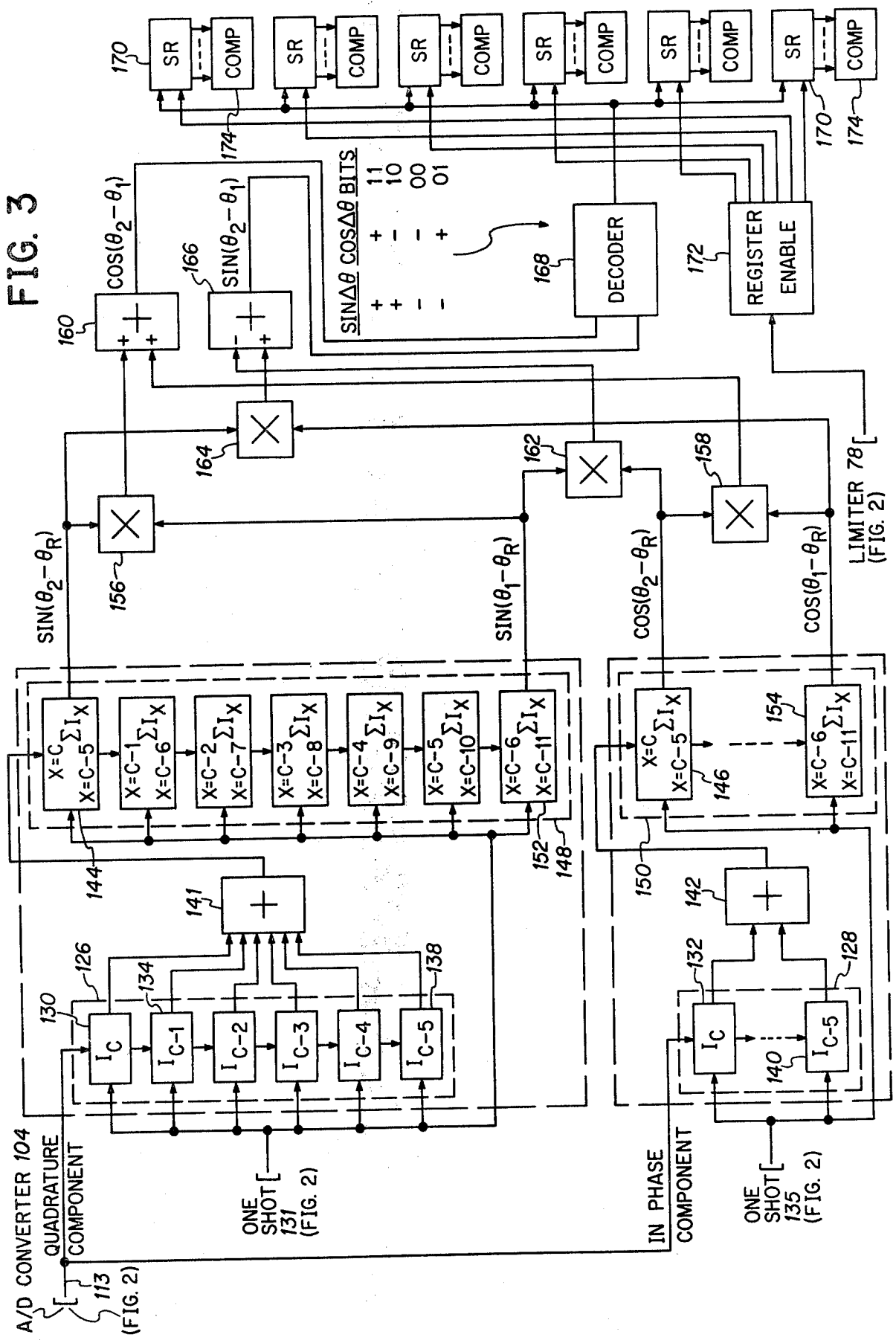
FIG. 3 depicts the digital components of the invention for storing and combining the various digital signals to derive the multiple baud values for the individual data bauds.

As shown in FIG. 3, the storage circuitry for retaining the digital integrated value outputs of A/D converter 104 on lead 113 comprises one group of six series connected registers 126 corresponding to the quadrature (sine) component, and another set of six series connected registers 128 corresponding to the in phase (cosine) component. Each time a new integrated digital value $I_c$ (the subscript c denoting current interval) is generated at the output of A/D converter 104, it is stored in the first register of a register group, the quadrature component being placed into register 130 of group 126, and the in phase component into register 132 of group 128. Just prior thereto the value in each register is shifted to the next register in the series chain so that the value that had been stored in register 130 is passed to register 134 and likewise, the value that had been stored in register 132 is passed to the next register (not shown) in the chain for group 128. The values stored in the last registers of the register groups, namely 138 for group 126 and 140 for group 128, are no longer retained when supplanted by the new value received from the preceding register. The foregoing is represented by the notation $I_{c-1}$ through $I_{c-5}$ for the registers in groups 126 and 128. The registers of register group 126 corresponding to the quadrature component are clocked by the output of a one shot multivibrator 131, shown in FIG. 2, which is triggered at the end of an A/D conversion operation by the lagging edge of the A/D control pulses (FIG. 4 waveform) for controlling quadrature component switches 106 and 110 via an OR gate 133 whose inputs are connected to the outputs of one shot multivibrators 114 and 120. Likewise, the registers of register group 128 corresponding to the in phase component are clocked by the output of a one shot multivibrator 135 by the lagging edge of the A/D control pulses for controlling in phase component switches 108 and 112 via an OR gate 135 whose inputs are connected to the outputs of delay circuits 116 and 122.

Upon receipt of each new integrated digital value $I_c$, the outputs of the registers in each register group 126 and 128 constituting the corresponding integrated values for the previous five intervals (c-1 to c-5) are digitally summed by respective digital adders 140 and 142. The digital integrated value summations of adders 140 and 142, denoted $$\sum_{x=c-5}^{x=c} I_x,$$

are then applied to registers 144 and 146 respectively, each of which is the first register of a group of seven series connected registers 148 and 150 respectively. As with the register groups 126 and 128, each register in groups 148 and 150 passes the digital value stored therein to the next succeeding register prior to receiving the digital stored value in the preceding register under the clock output of one shot multivibrators 131 and 135, respectively. Since there are seven registers in each group 148 and 150, the summations of six integrated values entered into the first registers 144 and 146 are eventually stored in the last registers 152 and 154 of groups 148 and 150 respectively, six integration intervals later. Also, since differential phase shift keying entails comparing each baud period with the previous baud period acting as a reference, and since six integration intervals constitute a full baud period cycle herein, the output of register 144, which is proportional to sin $(\theta_2 - \theta_R)$, is compared with the output of register 152, which is proportional to sin $(\theta_1 - \theta_R)$ where, the subscript 2 denotes a current summation period and the subscript 1 denotes the preceding summation period. Similarly, the outputs of registers 146 and 154, respectively, proportional to cos $(\theta_2 - \theta_R)$ and cos $(\theta_1 - \theta_R)$ are employed in the comparison to eliminate the reference angle $\theta_R$ and obtain the phase angle advancement of $\theta_2 - \theta_1$ in consecutive baud periods. Thus, as delineated in U.S. Pat. No. 3,368,036, the outputs of registers 144 and 152 are multiplied in digital multiplier 156 and summed with the product of the outputs of registers 146 and 154 appearing at the output of digital multiplier 158 in digital adder 160 to render the term cos $(\theta_2 - \theta_1)$. The term sin $(\theta_2 - \theta_1)$ is obtained by adding the product of the outputs of registers 152 and 146, available at the output of digital multiplier 162, to the negative value of the product of the outputs of registers 144 and 154, available at the output of digital multiplier 164, in digital adder 166. The signs of the output signals for adders 160 and 166 define the two bit values engendered by the baud as represented by the summation of integrated values corresponding to the six integration intervals, appearing serially at the output of decoder 168 with the designated format. Since there are six such intervals during each baud period it is readily apparent that there will be six values of baud data, each consisting of two bits, for selecting the proper baud value. These six values are stored in a group of six registers 170 by cyclical sequential application thereto under control of a register enable circuit 172 having a count of six which is triggered from the output at limiter 78 once during each integration interval. During each interval the two data bits defining the baud value are serially clocked from the output of decoder 168 into the enabled register 170 in their proper order. The two clock pulses for entering the two serial bits in each of the registers 170 can simply be provided from register enable circuit 172 through a ring counter having a count of six whose output leads are individually connected to the registers 170 via a pair of one shot multivibrators for each lead (not shown). After two bits are entered in the last register 170, such as the bottom register, the next two bits are entered in the first register 170, such as the top register. In this fashion, the transmitted message consisting of any number of serial bits is formulated in the six registers 170. Although different methods are available for selecting which one or ones of the registers is most apt to have an error free message, the simplest and preferred way to select one of the registers for accessing the message is merely to monitor the entire message for a recognizable bit pattern in specified portions thereof, such as the preamble and address fields. The first register 170 to display the requisite bit pattern is the one considered to have an acceptable error-free message. The foregoing is effectuated with the use of a group of six comparators 174, each containing the same bit pattern against which to compare the contents of a different one of the registers 170. As soon as a successful comparison occurs, the comparator involved generates an output signal which may be used to transfer the message in its associated register to a permanent storage device for subsequent utilization (not shown).

As may be readily apparent, the retention of each integrated value summation for n subsequent intervals following its development for reference purposes, may be accomplished in ways other than just described in connection with FIG. 3. For example, in lieu of each group of seven registers 148 and 150, one could substitute six registers for storing the six integrated values corresponding to the seventh through twelfth integration intervals previous to the current integration interval and a digital adder for summing same. The output of this adder, would, of course, be equal to the output of register 152 for the quadrature component or register 154 for the in phase component to provide a reference against which to respectively compare the outputs of adders 140 and 142.

As demonstrated by the foregoing, the subject invention affords an improved integration technique for use in detecting digital data conveyed by a carrier signal having a characteristic which is varied during each baud period in a predetermined manner in accordance with the data. Minimal apparatus is employed without sacrificing message reception times. Although the invention has been presented in conjunction with a specific application, namely developing multiple baud values per baud period from which to select a valid message for obviating zero crossing ambiguity problems in data detection which is specifically addressed by copending patent application Ser. No. 015,672, other applications therefore are discernible. For example, the subject integration technique could just as well be used to identify a particular one of the AC signal crossings to which to synchronize for baud timing purposes which is an alternative solution to the data detection ambiguity problem specifically addressed by copending patent application Ser. No. 015,104 entitled "Means For Deriving Baud Timing From An Available AC Signal." Since modifications which do not necessarily depart from the scope and spirit of the invention herein may very well occur to those skilled in the art, the foregoing detailed description should be construed as merely exemplary and not circumstriptive of the invention as it will now be claimed hereinbelow.

What is claimed is:

1. Demodulation means for demodulating a carrier signal bearing digital data which varies a characteristic of the carrier signal during each baud period in a predetermined manner to identify the baud value during the period, comprising:

means for converting the carrier signal characteristic to a DC signal indicative of the digital data;
timing means for subdividing each baud period into n plural intervals;
means for integrating the DC signal over each of said intervals and storing same for a subsequent period of n-1 intervals, and
means for summing the integrated DC signal attained at the end of each interval with the integrated DC signals attained at the end of the previous n-1 intervals.

2. The demodulator means of claim 1 including means for storing the integrated DC signal summations.

3. The demodulator means of claim 2 wherein said integrating means comprises a pair of integrators, each for integrating the DC signal during alternate intervals while the other is initialized to a predetermined state preparatory to an integrating cycle.

4. The demodulator means of claims 2 or 3 wherein said timing means is controlled by an AC signal and n is equal to the number of zero crossings of said AC signal during each baud period, and whereby each interval is initiated at one of the zero crossings.

5. The demodulator means of claim 4 wherein the AC signal corresponds to the frequency of an electric power system over which the carrier signal is transmitted.

6. A method for demodulating a carrier signal bearing digital data which varies a characteristic of the carrier signal during each baud period in a predetermined manner to identify the baud value during the period, comprising:

converting the carrier signal characteristic to a DC signal indicative of the digital data;
subdividing each baud period into n plural intervals;
integrating the DC signal over each of said intervals and storing same for a subsequent period of n-1 intervals, and
summing the integrated DC signal attained at the end of each interval with the integrated DC signals attained at the end of the previous n-1 intervals.

7. The method of claim 6 including storing the integrated DC signal summations.

8. The method of claim 7 wherein said subdividing is controlled by an AC signal and n is equal to the number of zero crossings of said AC signal during each baud period, and whereby each interval is initiated at one of the zero crossings.

9. The method of claim 8 wherein the AC signal corresponds to the frequency of an electric power system over which the carrier signal is transmitted.

* * * * *